(12) United States Patent
Jung

(10) Patent No.: US 7,862,061 B2
(45) Date of Patent: Jan. 4, 2011

(54) AIR SUSPENSION SYSTEM

(75) Inventor: Joon Chai Jung, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 362 days.

(21) Appl. No.: 12/028,116

(22) Filed: Feb. 8, 2008

(65) Prior Publication Data

US 2009/0102154 A1   Apr. 23, 2009

(30) Foreign Application Priority Data

Oct. 22, 2007   (KR) .................. 10-2007-0106201

(51) Int. Cl.
*F16F 9/43* (2006.01)
*B60G 11/26* (2006.01)

(52) U.S. Cl. ................... 280/124.157; 280/124.16; 280/5.514; 280/6.157; 267/64.28

(58) Field of Classification Search ..................
280/124.157–124.161, 5.514, 6.157, 6.158;
267/64.28
See application file for complete search history.

(56) References Cited

U.S. PATENT DOCUMENTS

| | | | |
|---|---|---|---|
| 4,836,511 A * | 6/1989 | Buma et al. ............. | 267/64.16 |
| 6,173,974 B1 * | 1/2001 | Raad et al. ............. | 280/6.157 |
| 6,189,903 B1 * | 2/2001 | Bloxham ............... | 280/124.16 |
| 6,354,617 B1 * | 3/2002 | Behmenburg et al. . | 280/124.157 |
| 6,729,363 B2 * | 5/2004 | Stiller et al. ........... | 141/38 |
| 6,845,988 B2 * | 1/2005 | Romer et al. .......... | 280/5.514 |
| 7,032,895 B2 * | 4/2006 | Folchert ................ | 267/64.28 |
| 7,097,166 B2 * | 8/2006 | Folchert ................ | 267/64.28 |
| 7,255,209 B2 | 8/2007 | Jung | |
| 2002/0079626 A1 * | 6/2002 | Grotendorst et al. ... | 267/64.19 |
| 2003/0047853 A1 * | 3/2003 | Behmenburg ......... | 267/64.28 |
| 2003/0218281 A1 * | 11/2003 | Ocker et al. .......... | 267/64.28 |
| 2004/0188970 A1 | 9/2004 | Matern et al. | |
| 2006/0017250 A1 | 1/2006 | Kim | |
| 2006/0033299 A1 | 2/2006 | Hecker et al. | |
| 2006/0043691 A1 * | 3/2006 | Geiger ................. | 280/124.16 |
| 2006/0049013 A1 | 3/2006 | Jung | |
| 2007/0096554 A1 | 5/2007 | Detlefs et al. | |

* cited by examiner

*Primary Examiner*—Ruth Ilan
(74) *Attorney, Agent, or Firm*—Greenblum & Bernstein P.L.C.

(57) ABSTRACT

An air suspension system includes a first transfer pipe having one end communicating with the outside, the first transfer pipe being constructed such that air flows through the first transfer pipe; a filter mounted adjacent to the one end of the first transfer pipe to filter out foreign matter from the air; a compressor mounted on the first transfer pipe, such that the compressor is located adjacent to the filter, to compress the air; a dryer mounted on the first transfer pipe, such that the dryer is located adjacent to the compressor, to dry the air; an exhaust pipe extending from the first transfer pipe between the compressor and the dryer; an exhaust valve mounted on the exhaust pipe to control the flow of the air; a second transfer pipe communicating with the other end of the first transfer pipe; a control unit connected to the second transfer pipe, the control unit being constructed such that the high and low of the control unit are controlled by the pressure of the air; and a storage unit connected to the second transfer pipe to store the compressed air.

18 Claims, 7 Drawing Sheets

AIR SUSPENSION SYSTEM

BACKGROUND OF THE INVENTION

1. Field of the Invention

The present invention relates to an air suspension system, and, more particularly, to an air suspension system including a reduced number of valves and that is capable of minimizing the use of a compressor.

2. Description of the Related Art

Generally, a suspension does not simultaneously satisfy ride comfort and control stability. When the ride comfort is increased, the control stability decreases. When the control stability is increased, the ride comfort decreases. The reason is as follows. When springs of the suspension are soft, the springs easily absorb impacts generated due to an uneven load surface, and therefore, the ride comfort increases. However, a car body is unstable, and therefore, the control stability decreases. When springs of the suspension are hard, on the other hand, the control stability increases. However, the springs cannot sufficiently absorb impacts generated due to the unevenness of the load surface, and therefore, the ride comfort decreases. It is very difficult to change the strength of a conventional coil spring, which is made of steel. For this reason, an air spring using air has been developed. The air spring may be easily hardened or softened through the control of air pressure, if necessary. A suspension using such air springs is called an air suspension.

FIG. 1 is a view illustrating a conventional air suspension system.

Referring to FIG. 1, the conventional air suspension system includes a dryer 12 mounted on a compressed air pipe 11. A compressor outlet 13 is connected to a storage tank 14 via the dryer 12. Air is carried to the storage tank 14 from the atmosphere through an intake valve 15, a compressor 16, and the dryer 12. Also, compressed air is discharged from the storage tank 14 to the atmosphere through the dryer 12 and the intake valve 15. In this case, air flows in the direction opposite to the direction in which the air is charged from the atmosphere into the storage tank 14, whereby the satisfactory regeneration of the dryer 12 is guaranteed. Unexamined reference numeral 6 indicates a switching valve for controlling the flow direction of air, and unexamined reference numeral 17 indicates an opening and closing valve for controlling the outflow and inflow of air from and into an air spring 18. Also, unexamined reference numeral 7 indicates a check valve for preventing the backward flow of air, and unexamined reference numeral 8 indicates a throttle valve for increasing the flow speed of air.

In the air suspension system constructed as shown in FIG. 1, the number of the valves is large, whereby it is difficult to diagnose the breakdown of the valves, and the manufacturing costs of the air suspension system are great.

On the other hand, a two-way three-port valve, which controls the flow direction of air, may be used to restrain the excessive use of the valves. However, the two-way three-port valve has problems in that the power consumption of the two-way three-port valve is high, and the manufacturing costs of the two-way three-port valve are great.

SUMMARY OF THE INVENTION

Therefore, the present invention has been made in view of the above problems, and it is an object of the present invention to provide an air suspension system including a reduced number of valves, whereby a circuit of the air suspension system is simplified, and the manufacturing costs of the air suspension system are reduced.

In accordance with one aspect of the present invention, the above and other objects can be accomplished by the provision of an air suspension system including a first transfer pipe having one end communicating with the outside, the first transfer pipe being constructed such that air flows through the first transfer pipe, a filter mounted adjacent to the one end of the first transfer pipe for filtering out foreign matter from the air, a compressor mounted on the first transfer pipe, such that the compressor is located adjacent to the filter, for compressing the air, a dryer mounted on the first transfer pipe, such that the dryer is located adjacent to the compressor, for drying the air, an exhaust pipe extending from the first transfer pipe between the compressor and the dryer, an exhaust valve mounted on the exhaust pipe for controlling the flow of the air, a second transfer pipe communicating with the other end of the first transfer pipe, a control unit connected to the second transfer pipe, the control unit being constructed such that the high and low of the control unit are controlled by the pressure of the air, and a storage unit connected to the second transfer pipe for storing the compressed air.

Preferably, the air suspension system further includes a first check valve mounted on the first transfer pipe between the compressor and the exhaust pipe.

Preferably, the air suspension system further includes an injector mounted at the tip end of the exhaust pipe for injecting air into an external object.

Preferably, the air suspension system further includes a second check valve mounted on the first transfer pipe between the dryer and the second transfer pipe, a bypass pipe communicating with the first transfer pipe, the bypass pipe being constructed to allow the air to bypass the second check valve, and a throttle valve mounted on the bypass pipe.

Preferably, the air suspension system further includes a pressure sensor mounted on the second transfer pipe.

Preferably, the control unit includes a branch pipe having one end communicating with the second transfer pipe, an air spring connected to the other end of the branch pipe, the air spring being constructed such that the high and low of the air spring are controlled by the pressure of the air, and an on-off valve mounted on the branch pipe for controlling the outflow and inflow of the air.

Preferably, the storage unit includes a storage pipe having one end communicating with the second transfer pipe, a storage tank connected to the other end of the storage pipe, the storage tank being constructed such that compressed air is stored in the storage tank, and an opening and closing valve mounted on the storage pipe for controlling the outflow and inflow of the air.

In accordance with another aspect of the present invention, there is provided an air suspension system including a first transfer pipe having one end communicating with the outside, the first transfer pipe being constructed such that air flows through the first transfer pipe, a filter mounted adjacent to the one end of the first transfer pipe for filtering out foreign matter from the air, a compressor mounted on the first transfer pipe, such that the compressor is located adjacent to the filter, for compressing the air, a dryer mounted on the first transfer pipe, such that the dryer is located adjacent to the compressor, for drying the air, an exhaust pipe extending from the first transfer pipe between the compressor and the dryer, an exhaust valve mounted on the exhaust pipe for controlling the flow of the air, a first check valve mounted on the first transfer pipe between the compressor and the exhaust pipe, a second transfer pipe communicating with the other end of the first transfer pipe, a second check valve mounted on the first transfer pipe between the dryer and the second transfer pipe, a bypass pipe communicating with the first transfer pipe, the bypass pipe being constructed to allow the air to bypass the second check valve, a throttle valve mounted on the bypass pipe, a control unit connected to the second transfer pipe, the control unit being constructed such that the high and low of the control unit are controlled by the pressure of the air, and a storage unit connected to the second transfer pipe for storing the compressed air.

Preferably, the air suspension system further includes a pressure sensor mounted on the second transfer pipe.

Preferably, the air suspension system further includes an injector mounted at the tip end of the exhaust pipe for injecting air into an external object.

Preferably, the control unit includes a branch pipe having one end communicating with the second transfer pipe, an air spring connected to the other end of the branch pipe, the air spring being constructed such that the high and low of the air spring are controlled by the pressure of the air, and an on-off valve mounted on the branch pipe for controlling the outflow and inflow of the air.

Preferably, the storage unit includes a storage pipe having one end communicating with the second transfer pipe, a storage tank connected to the other end of the storage pipe, the storage tank being constructed such that compressed air is stored in the storage tank, and an opening and closing valve mounted on the storage pipe for controlling the outflow and inflow of the air.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
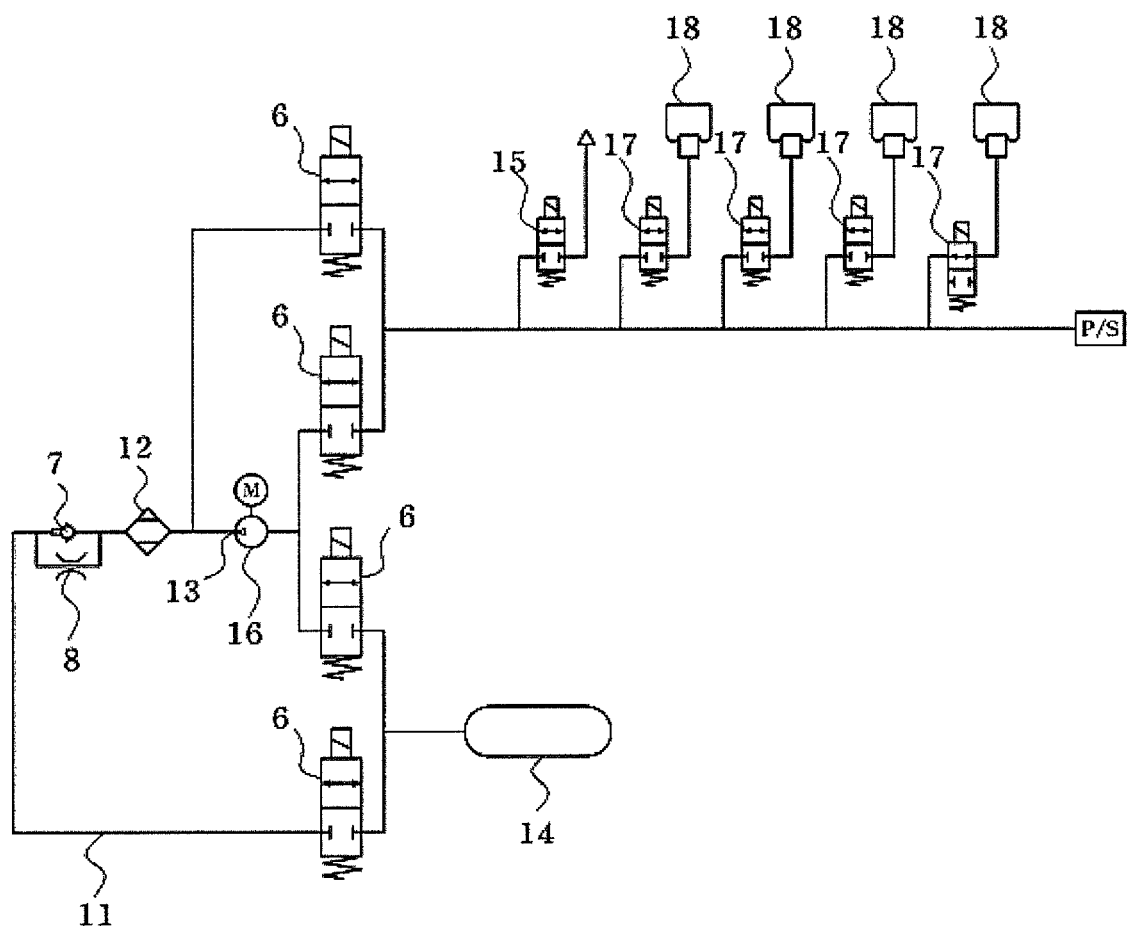
FIG. 1 is a view illustrating a conventional air suspension system.

Now, an air suspension system according to a preferred embodiment of the present invention will be described in detail with reference to the accompanying drawings.

It should be noted that the thicknesses of lines and the sizes of components shown in the drawings may be exaggerated for simplicity and clarity of description.

Also, it should be noted that the following terms are the ones defined in consideration of the functional characteristics of the present invention, and therefore, the meanings of the following terms may be changed according to an intension of a user or an operator or according to custom.

Therefore, the definition of the following terms must be given based on the description made throughout the specification.

Figure 2:
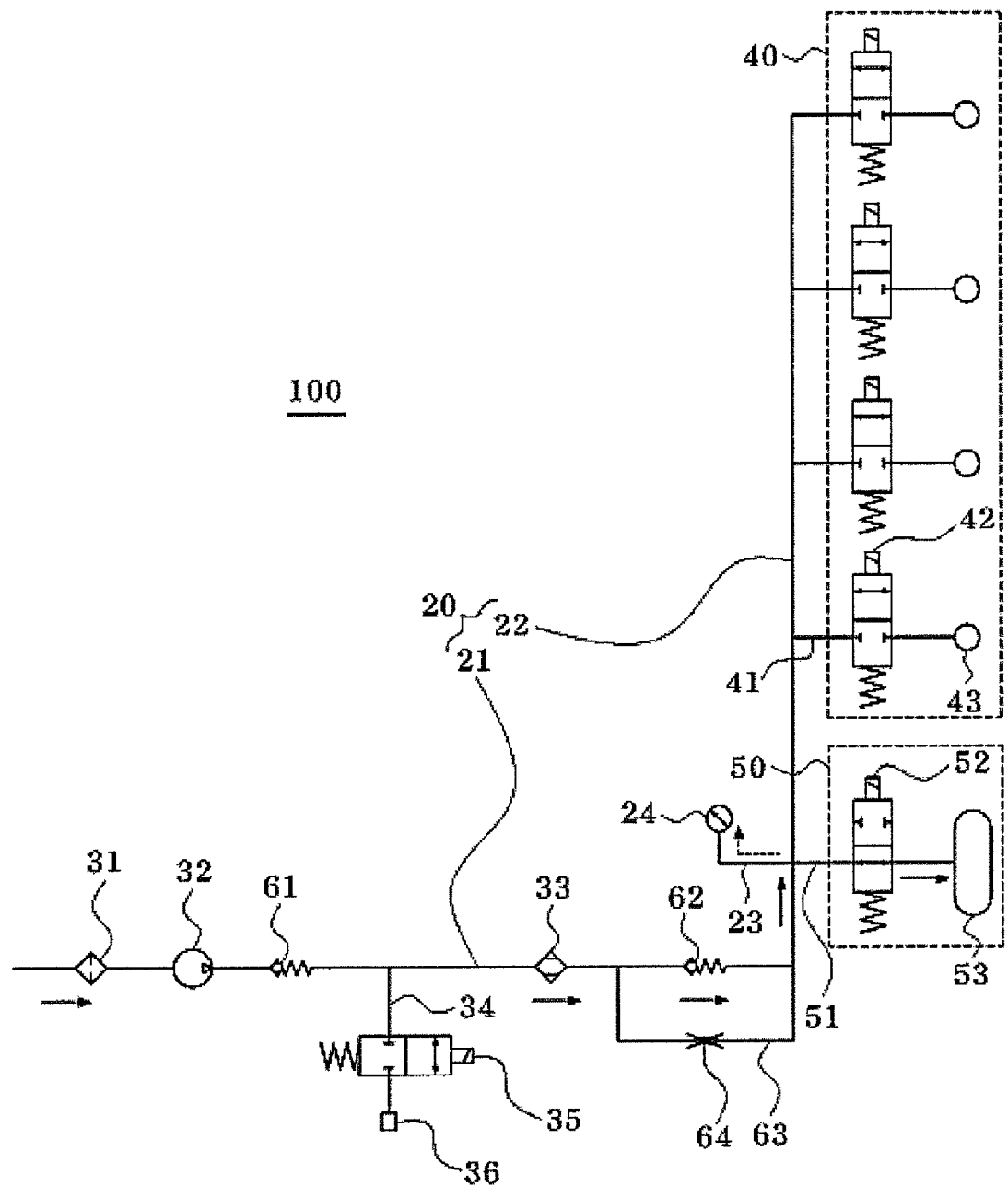
FIG. 2 is a view illustrating a route, through which external air is introduced into a storage unit, in an air suspension system according to a preferred embodiment of the present invention.
Figure 3:
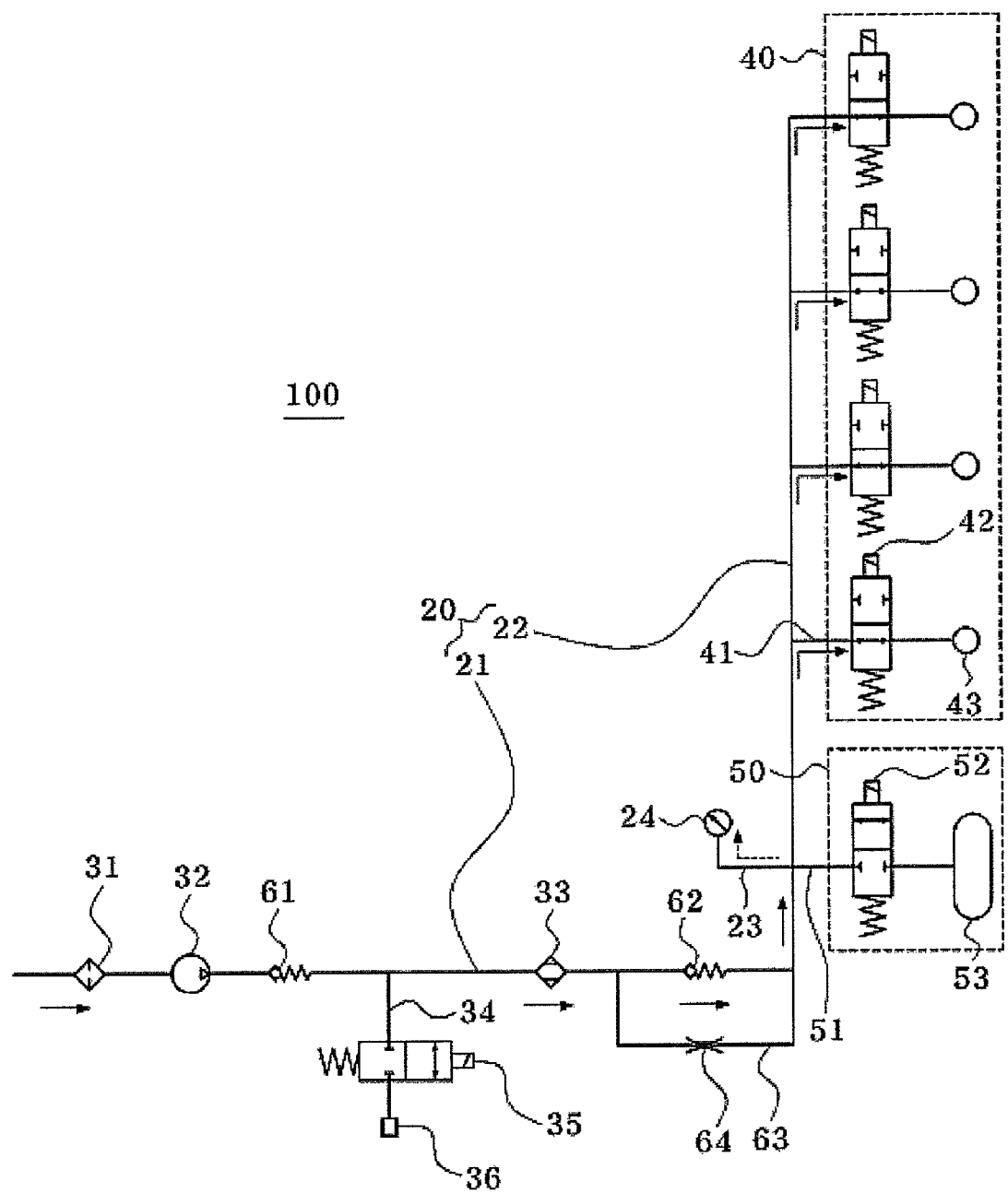
FIG. 3 is a view illustrating a route, through which external air is introduced into a control unit, in the air suspension system according to the preferred embodiment of the present invention.
Figure 4:
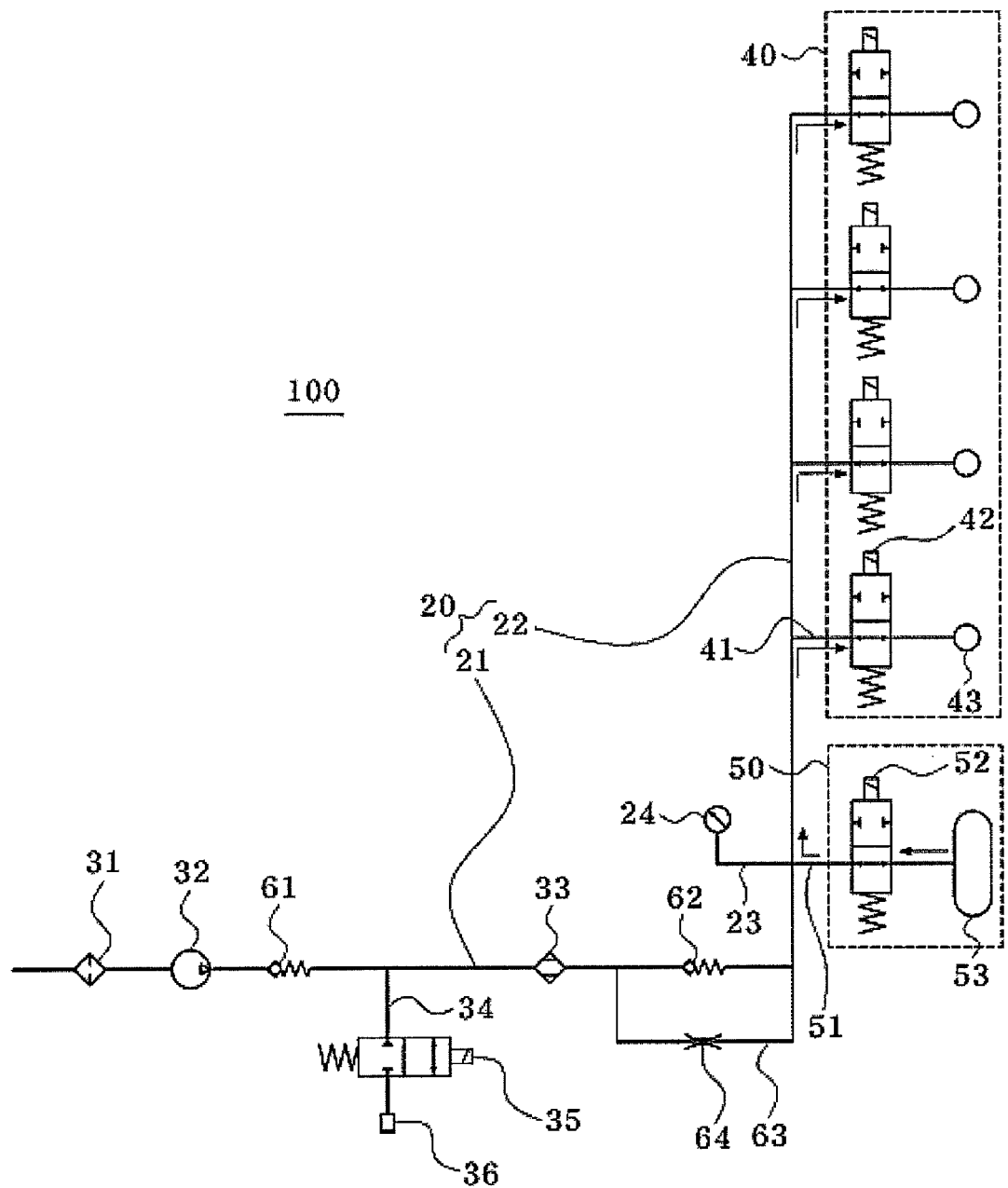
FIG. 4 is a view illustrating a route, through which air is introduced from the storage unit into the control unit, in the air suspension system according to the preferred embodiment of the present invention.
Figure 5:
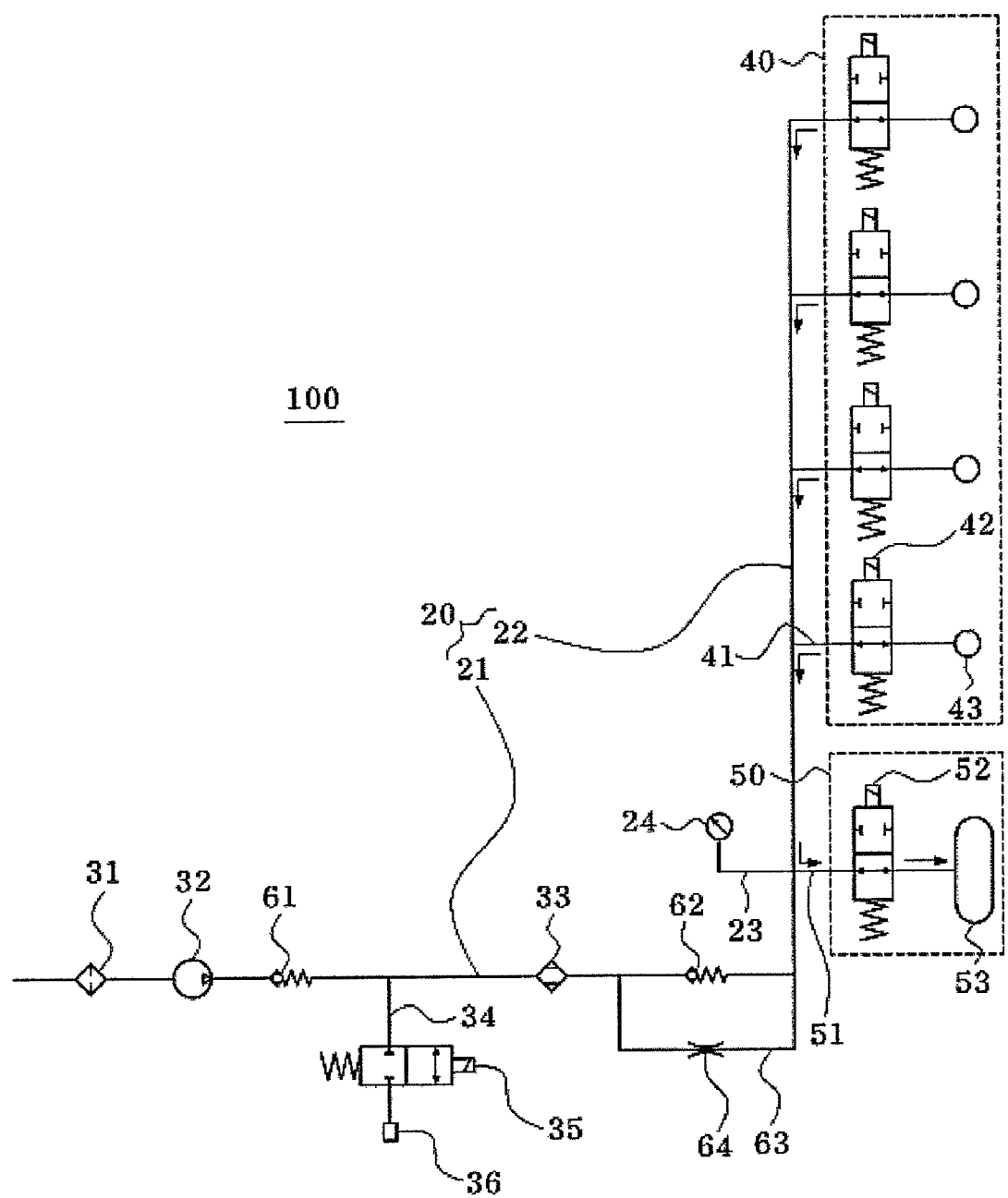
FIG. 5 is a view illustrating a route, through which air is introduced from the control unit into the storage unit, in the air suspension system according to the preferred embodiment of the present invention.
Figure 6:
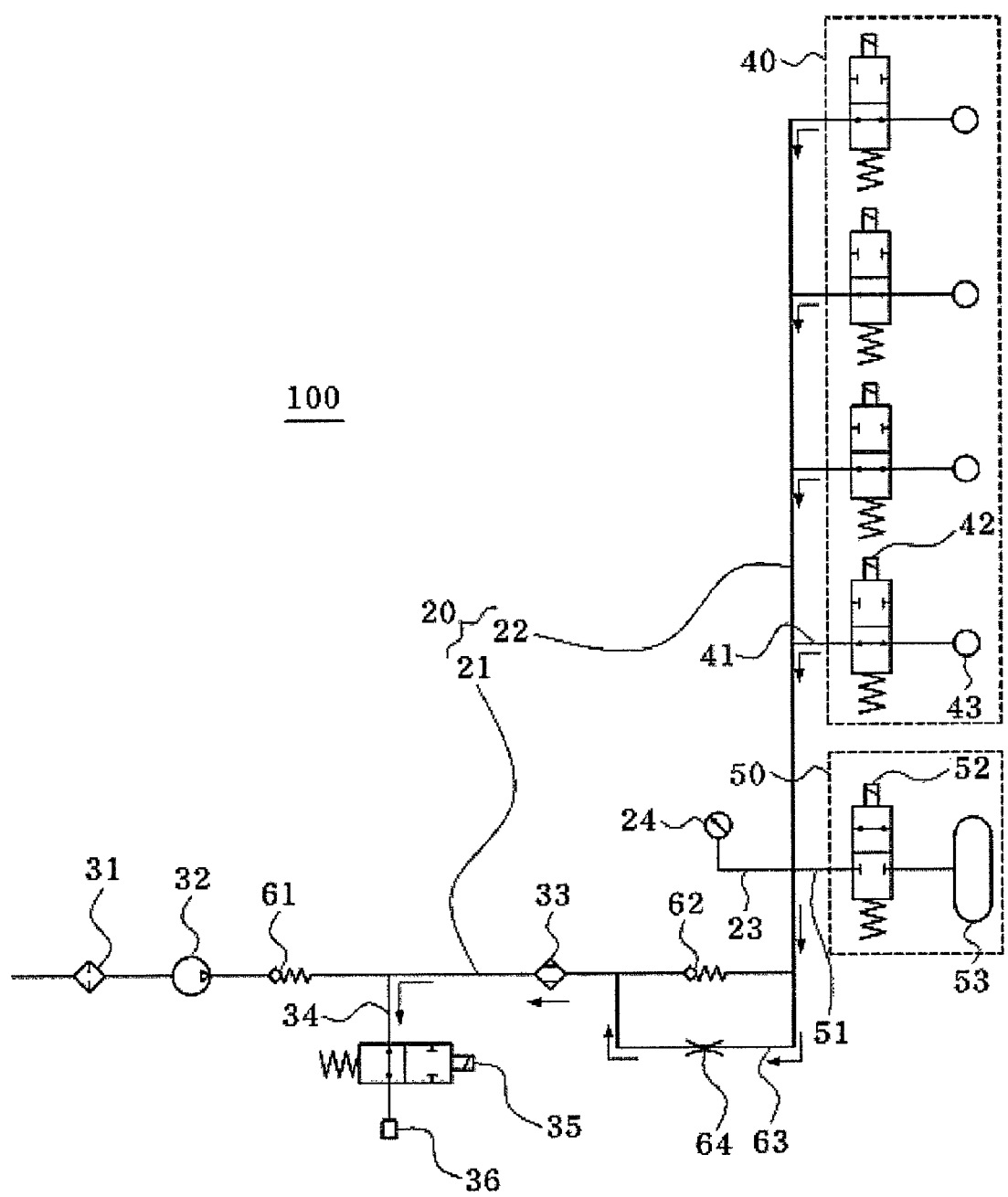
FIG. 6 is a view illustrating a route, through which air is discharged from the control unit to the outside, in the air suspension system according to the preferred embodiment of the present invention.
Figure 7:
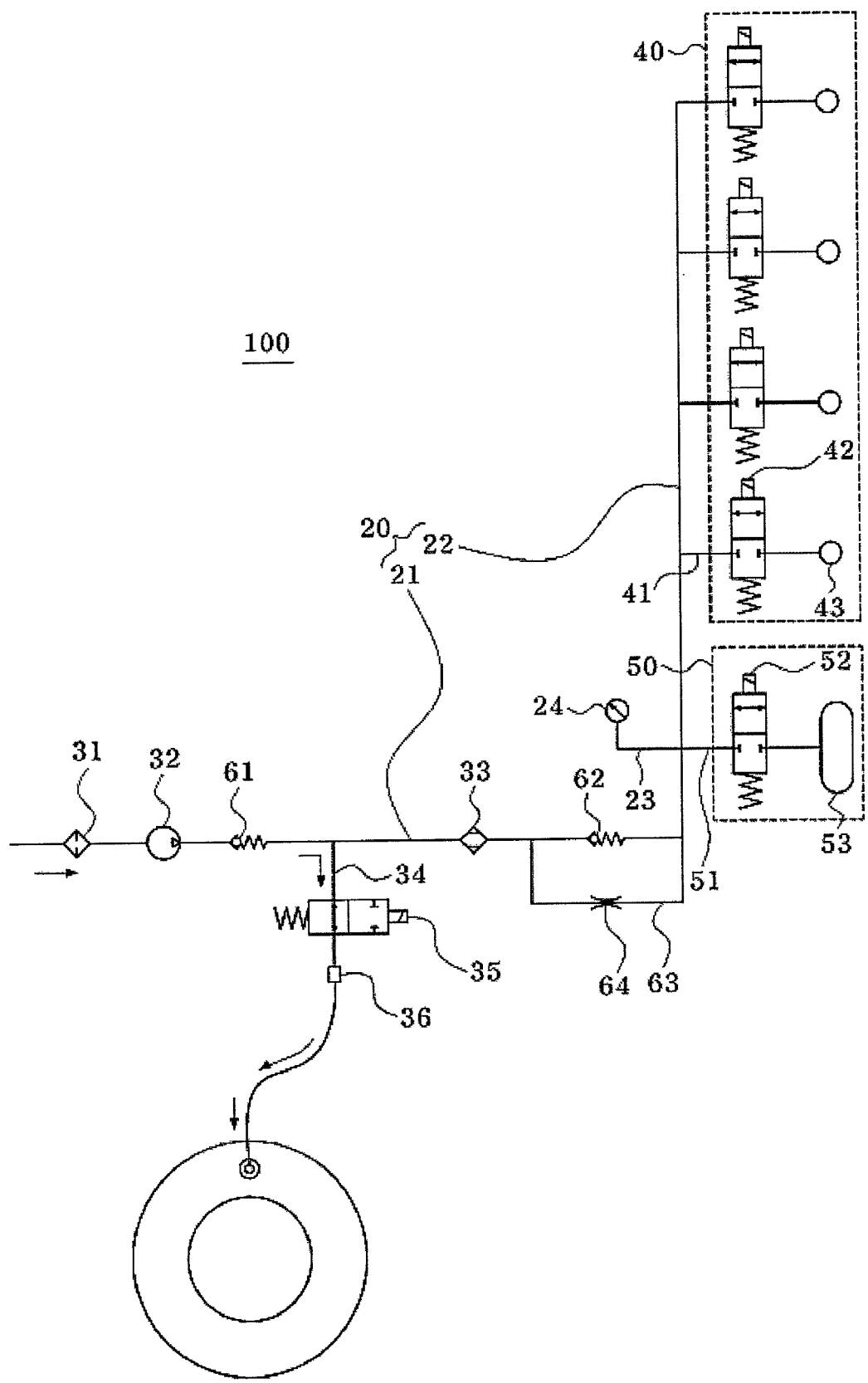
FIG. 7 is a view illustrating a route, through which air is injected into an external object, in the air suspension system according to the preferred embodiment of the present invention.

FIG. 2 is a view illustrating a route, through which external air is introduced into a storage unit, in an air suspension system according to a preferred embodiment of the present invention, FIG. 3 is a view illustrating a route, through which external air is introduced into a control unit, in the air suspension system according to the preferred embodiment of the present invention, FIG. 4 is a view illustrating a route, through which air is introduced from the storage unit into the control unit, in the air suspension system according to the preferred embodiment of the present invention, FIG. 5 is a view illustrating a route, through which air is introduced from the control unit into the storage unit, in the air suspension system according to the preferred embodiment of the present invention, FIG. 6 is a view illustrating a route, through which air is discharged from the control unit to the outside, in the air suspension system according to the preferred embodiment of the present invention, and FIG. 7 is a view illustrating a route, through which air is injected into an external object, in the air suspension system according to the preferred embodiment of the present invention.

Referring to FIGS. 2 to 7, an air suspension system 100 according to the present invention includes a transfer pipe 20, a storage unit 50 for storing air, and a control unit 40, the high and low of which are controllable by air pressure.

The transfer pipe 20, serving as an air flow channel, includes a first transfer pipe 21 and a second transfer pipe 22. The first transfer pipe 21 and the second transfer pipe 22 connected to each other such that the air can flow through the first transfer pipe 21 and the second transfer pipe 22. One end of the first transfer pipe 21 communicates with the outside such that external air can be introduced into the first transfer pipe 21. Here, the reason why the transfer pipe 20 is constituted by the first transfer pipe 21 and the second transfer pipe 22 is to clearly describe the installation positions of parts mounted on the transfer pipe 20. Consequently, the transfer pipe 20 may be constructed in the form of a single pipe.

On the first transfer pipe 21 are mounted a filter 31, a compressor 32, and a dryer 33, which are arranged successively from one end of the first transfer pipe 21. The filter 31 serves to filter out foreign matter from air introduced outside, the compressor serves to compress the filtered air, and the dryer 33 serves to dry the compressed air.

An exhaust pipe 34 for discharging air flowing in the air suspension system 100 extends from the first transfer pipe 21 between the compressor 32 and the dryer 33. The tip end of the exhaust pipe 34 communicates with the outside. On the exhaust pipe 34 is mounted an exhaust valve 35, which opens and closes the exhaust pipe 34 to control the air to be discharged.

The control unit 40, the high and low of which are controllable by air pressure, and the storage unit 50, in which the air is stored, are mounted on the second transfer pipe 22.

On the other hand, a first check valve 61 is mounted on the first transfer pipe 21 between the compressor 32 and the exhaust pipe 34. The first check valve 61 serves to prevent the air in the transfer pipe 20 from flowing backward to the compressor 32.

A second check valve 62 is mounted on the first transfer pipe 21 between the dryer 33 and the second transfer pipe 22. Also, a bypass pipe 63, opposite ends of which are connected to the first transfer pipe 21, is constructed such that air bypasses the second check valve 62. A throttle valve 64 is mounted on the bypass pipe 63. The second check valve 62 serves to prevent air from flowing from the second transfer pipe 22 to the first transfer pipe 21. Consequently, air, flowing through the bypass pipe 63, is accelerated by the throttle valve 64, and is guided to the dryer 33.

A pressure sensor 24 is mounted on the second transfer pipe 22. The pressure sensor 24 serves to measure the pressure of air flowing to the control unit 40 or the storage unit 50. The pressure sensor 24 may be directly connected to the second transfer pipe 22 or may be connected to a pressure pipe extending from the second transfer pipe 22.

The control unit 40 includes branch pipes 41, on-off valves 42, and air springs 43. One end of each branch pipe 41 diverges from the second transfer pipe 22, and the other end of each branch pipe 41 is connected to the corresponding air spring 43. The on-off valves 42 are mounted on the respective branch pipes 41 to control the outflow and inflow of air. Since the high and low of the air springs 43 are controllable by air pressure, the air springs 43 are mounted to corresponding wheels of a car to absorb impacts applied to the car or control the high and low of the car. When the air suspension system 100 according to the present invention is applied to the car as describe above, the branch pipes 41 diverges from the second transfer pipe 22 to the corresponding wheels of the car.

The storage unit 50 includes a storage pipe 51, an opening and closing valve 52, and a storage tank 53. One end of the storage pipe 51 diverges from the second transfer pipe 22, and the other end of the storage pipe 51 is connected to the storage tank 53. The opening and closing valve 52 is mounted on the storage pipe 51 to control the outflow and inflow of air. Compressed air is stored in the storage tank 53.

On the other hand, an injector 36, used to inject air into an external object, such as a tire, a tube, an air mat or the like, is mounted at the tip end of the exhaust pipe 34.

Hereinafter, the operation of the air suspension system with the above-described construction according to the present invention will be described on the assumption that the exhaust valve 35, the on-off valves 42, and the opening and closing valve 52 are solenoid valves that control the flow of air under the control of a control unit (not shown), and valves which are not mentioned below are closed to restrict the flow of air.

First, a process for introducing external air into the storage unit 50 will be described with reference to FIG. 2. The opening and closing valve 52 opens the storage pipe 51. When the compressor 32 is driven in this state, external air is introduced from one end of the first transfer pipe 21, passes successively through the filter 31, the compressor 32, and the dryer 33, and is then guided to the second transfer pipe 22. Subsequently, the air is stored in the storage tank 53 through the storage pipe 51. At this time, some of the air, which will be stored in the storage tank 53, reaches the pressure sensor 24 through the pressure pipe 23. Consequently, the pressure of the air, which will be stored in the storage tank 53, is measured by the pressure sensor 24. When the pressure of air stored in the storage tank 53 measured by the pressure sensor 24 exceeds a predetermined pressure level, the opening and closing valve 52 closes the storage pipe 51, and therefore, air of a predetermined pressure is stored in the storage tank 53.

Next, a process for introducing external air into the control unit 40 will be described with reference to FIG. 3. The on-off valve 42 opens the branch pipe 41. When the compressor 32 is driven in this state, external air is introduced from one end of the first transfer pipe 21, passes successively through the filter 31, the compressor 32, and the dryer 33, and is then guided to the second transfer pipe 22. Subsequently, the air is stored in the air spring 43 through the branch pipe 41. At this time, some of the air, which will be stored in the air spring 43, reaches the pressure sensor 24 through the pressure pipe 23. Consequently, the pressure of the air, which will be stored in the air spring 43, is measured by the pressure sensor 24. In this way, the pressure of the air is controlled by measuring the pressure of the air spring 43, whereby the high and low of the air spring 43 are controlled. When a plurality of air springs 43 are provided, it is possible to control the high and low of the air springs 43 through the opening and closing of the on-off valves mounted on the respective branch pipes 41. Consequently, when the air springs 43 are mounted at the respective wheels of the car, it is possible to control the high and low of the car by controlling the high and low of the air springs 43 mounted at the respective wheels of the car. Meanwhile, FIG. 3 illustrates the flow of air when the initial injection of air into the air springs 43 is required as well as the control of the high and low of the air springs 43.

FIG. 4 illustrates the flow of air increasing the height of the air springs 43 when the pressure of the air stored in the storage tank 53 is greater than that of the air stored in the air springs 43. Specifically, the on-off valves 42 open the corresponding branch pipes 41, and the opening and closing valve 52 opens the storage pipe 51, such that the high and low of the car can be controlled through the increase of the height of the air springs 43. As a result, the air, stored in the air suspension system 100, flows to the respective air springs 43 due to the pressure difference of the air, and therefore, it is possible to control the high and low of the car. The flow of air is accomplished without using the compressor 32, and therefore; it is possible to increase the life span of the compressor 32.

FIG. 5 illustrates the flow of air decreasing the height of the air springs 43 when the pressure of the air stored in the air springs 43 is greater than that of the air stored in the storage tank 53. Specifically, the on-off valves 42 open the corresponding branch pipes 41, and the opening and closing valve 52 opens the storage pipe 51, such that the high and low of the car can be controlled through the decrease of the height of the air springs 43. As a result, the air, stored in the air suspension system 100, flows to the storage tank 53 due to the pressure difference of the air, and therefore, it is possible to control the high and low of the car.

FIG. 6 illustrates the flow of air decreasing the height of the air springs 43 when the pressure of the air stored in the air springs 43 is less than that of the air stored in the storage tank 53. Specifically, the on-off valves 42 open the corresponding branch pipes 41, and the exhaust valve 35 opens the exhaust pipe 34, such that the high and low of the car can be controlled through the decrease of the height of the air springs 43. As a result, the air, stored in the air suspension system 100, flows successively to the bypass pipe 63, the first transfer pipe 21, and the exhaust pipe 34 due to the pressure difference of the air, and is then discharged to the outside. At this time, the flow rate of the air, stored in the air suspension system 100, is decreased, but the speed of the air, stored in the air suspension system 100, is increased, by the throttle valve 64. The air passes through the dryer 33, and therefore, moisture in the dryer 33 is effectively removed.

FIG. 7 illustrates the flow of air, which is injected into an external object using the air suspension system 100. To this end, the exhaust valve 35 opens the exhaust pipe 34. When the compressor 32 is driven in this state, external air is introduced from one end of the first transfer pipe 21, passes successively through the filter 31 and the compressor 32, and is then guided to the exhaust pipe 34. At this time, the injector 36, mounted at the tip end of the exhaust pipe 34, is coupled to an air inlet port of the external object such that air can be injected into the external object.

Meanwhile, when the air suspension system 100 according to the present invention is applied to a car, the high and low of the respective wheels of the car are controlled frequently to improve ride comfort of the car.

Consequently, when the pressure of the air stored in the storage tank 53 is maintained greater than that of the air stored in the respective air springs 43, the air flows as follows. First, the height of the air springs 43 is increased through the flow of the air as shown in FIG. 4, and then the height of the air springs 43 is decreased through the flow of the air as shown in FIG. 6. Subsequently, a predetermined pressure of the air is created in the storage tank 53 through the flow of the air as shown in FIG. 2.

On the other hand, when the pressure of the air stored in the storage tank 53 is lowered to a pressure less than that of the air stored in the air springs 43 during the increase of the air springs 43, the air flows as follows. First, the height of the air springs 43 is increased through the flow of the air as shown in FIG. 4, and then the height of the air springs 43 is further increased through the flow of the air as shown in FIG. 3. In this state, the storage tank 53 is replenished with air, through the flow of the air as shown in FIG. 5, to decrease the height of the air springs 43. At this time, when the pressure of the air stored in the storage tank 53 is greater than that of the air stored in the air springs 43, the height of the air springs 43 is further decreased through the flow of the air as shown in FIG. 6. Subsequently, a predetermined pressure of the air is created in the storage tank 53 through the flow of the air as shown in FIG. 2.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

In the above-described embodiment of the present invention, the flow of air was explained as an example; however, the present invention is not limited to the flow of the air. For example, fluid may flow through the first transfer pipe.

Consequently, it should be noted that the true technical protection scope of the present invention is defined by the following claims.

As apparent from the above description, it is possible to manufacture the air suspension system according to the present invention using a reduced number of valves. Consequently, the present invention has the effect of simplifying a circuit of the air suspension system and reducing the manufacturing costs of the air suspension system.

Furthermore, air flow is possible between the air springs and the storage tank, in the air suspension system according to the present invention, depending upon the air pressure of the storage tank. Consequently, the present invention has the effect of restraining unnecessary use of the compressor.

What is claimed is:

1. An air suspension system for a vehicle, the air suspension system comprising:
    a first transfer pipe having one end communicating with the outside, the first transfer pipe being constructed such that air flows through the first transfer pipe;
    a filter mounted adjacent to the one end of the first transfer pipe to filter out foreign matter from the air;
    a compressor mounted on the first transfer pipe, such that the compressor is located adjacent to the filter, to compress the air;
    a dryer mounted on the first transfer pipe, such that the dryer is located adjacent to the compressor, to dry the air;
    an exhaust pipe extending from the first transfer pipe between the compressor and the dryer;
    an exhaust valve mounted on the exhaust pipe to control the flow of the air;
    a second transfer pipe communicating with the other end of the first transfer pipe;
    a control unit connected to the second transfer pipe, the control unit being constructed such that the pressure of the air controls a high and low height of the vehicle;
    a storage unit connected to the second transfer pipe to store the compressed air; and
    a first check valve mounted on the first transfer pipe between the compressor and the exhaust pipe.

2. The air suspension system according to claim 1, further comprising:
    an injector mounted at the tip end of the exhaust pipe to inject air into an external object.

3. The air suspension system according to claim 1, further comprising:
    an injector mounted at the tip end of the exhaust pipe to inject air into an external object.

4. The air suspension system according to claim 1, further comprising:
    a second check valve mounted on the first transfer pipe between the dryer and the second transfer pipe;
    a bypass pipe communicating with the first transfer pipe, the bypass pipe being constructed to allow the air to bypass the second check valve; and
    a throttle valve mounted on the bypass pipe.

5. The air suspension system according to claim 1, further comprising:
    a pressure sensor mounted on the second transfer pipe.

6. The air suspension system according to claim 1, wherein the control unit includes
    a branch pipe having one end communicating with the second transfer pipe,
    an air spring connected to the other end of the branch pipe, the air spring being constructed such that the high and low of the air spring are controlled by the pressure of the air, and
    an on-off valve mounted on the branch pipe to control the outflow and inflow of the air.

7. The air suspension system according to claim 1, wherein the storage unit includes
    a storage pipe having one end communicating with the second transfer pipe,
    a storage tank connected to the other end of the storage pipe, the storage tank being constructed such that compressed air is stored in the storage tank, and
    an opening and closing valve mounted on the storage pipe to control the outflow and inflow of the air.

8. The air suspension system according to claim 1, wherein the exhaust pipe branches directly from a point located between the first check valve and dryer.

9. An air suspension system for a vehicle, the air suspension system comprising:
    a first transfer pipe having one end communicating with the outside, the first transfer pipe being constructed such that air flows through the first transfer pipe;

a filter mounted adjacent to the one end of the first transfer pipe to filter out foreign matter from the air;

a compressor mounted on the first transfer pipe, such that the compressor is located adjacent to the filter, to compress the air;

a dryer mounted on the first transfer pipe, such that the dryer is located adjacent to the compressor, to dry the air;

an exhaust pipe extending from the first transfer pipe between the compressor and the dryer;

an exhaust valve mounted on the exhaust pipe to control the flow of the air;

a first check valve mounted on the first transfer pipe between the compressor and the exhaust pipe;

a second transfer pipe communicating with the other end of the first transfer pipe;

a second check valve mounted on the first transfer pipe between the dryer and the second transfer pipe;

a bypass pipe communicating with the first transfer pipe, the bypass pipe being constructed to allow the air to bypass the second check valve;

a throttle valve mounted on the bypass pipe;

a control unit connected to the second transfer pipe, the control unit being constructed such that the pressure of the air controls a high and low height of the vehicle; and a storage unit connected to the second transfer pipe to store the compressed air.

10. The air suspension system according to claim 9, further comprising:

a pressure sensor mounted on the second transfer pipe.

11. The air suspension system according to claim 10, wherein the control unit includes a branch pipe having one end communicating with the second transfer pipe, an air spring connected to the other end of the branch pipe, the air spring being constructed such that the high and low of the air spring are controlled by the pressure of the air, and an on-off valve mounted on the branch pipe to control the outflow and inflow of the air.

12. The air suspension system according to claim 10, wherein the storage unit includes a storage pipe having one end communicating with the second transfer pipe, a storage tank connected to the other end of the storage pipe, the storage tank being constructed such that compressed air is stored in the storage tank, and an opening and closing valve mounted on the storage pipe to control the outflow and inflow of the air.

13. The air suspension system according to claim 9, further comprising:

an injector mounted at the tip end of the exhaust pipe to inject air into an external object.

14. The air suspension system according to claim 13, wherein the control unit includes a branch pipe having one end communicating with the second transfer pipe, an air spring connected to the other end of the branch pipe, the air spring being constructed such that the high and low of the air spring are controlled by the pressure of the air, and an on-off valve mounted on the branch pipe to control the outflow and inflow of the air.

15. The air suspension system according to claim 13, wherein the storage unit includes a storage pipe having one end communicating with the second transfer pipe, a storage tank connected to the other end of the storage pipe, the storage tank being constructed such that compressed all is stored in the storage tank, and an opening and closing valve mounted on the storage pipe to control the outflow and inflow of the air.

16. The air suspension system according to claim 9, wherein the control unit includes a branch pipe having one end communicating with the second transfer pipe, an air spring connected to the other end of the branch pipe, the air spring being constructed such that the high and low of the air spring are controlled by the pressure of the air, and an on-off valve mounted on the branch pipe to control the outflow and inflow of the air.

17. The air suspension system according to claim 9, wherein the storage unit includes a storage pipe having one end communicating with the second transfer pipe, a storage tank connected to the other end of the storage pipe, the storage tank being constructed such that compressed air is stored in the storage tank, and an opening and closing valve mounted on the storage pipe to control the outflow and inflow of the air.

18. The air suspension system according to claim 9, wherein the exhaust pipe branches directly from a point located between the first check valve and dryer.

* * * * *